Aug. 25, 1936.   R. SONNENBERG   2,052,520
HOLDER FOR DENTAL FLOSS AND THE LIKE
Filed Aug. 25, 1934
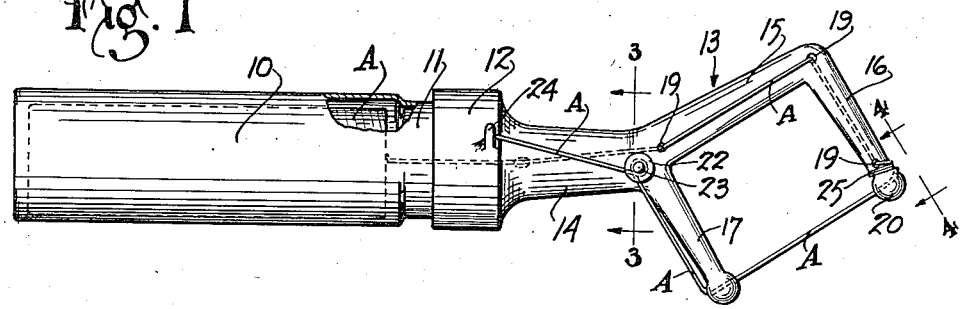
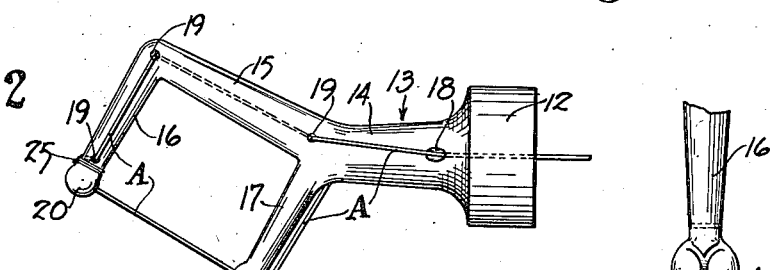
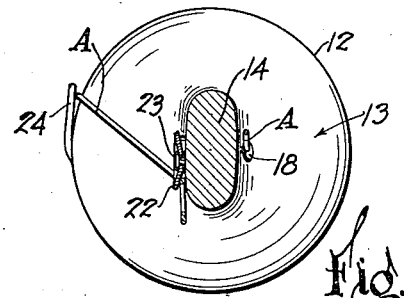
INVENTOR.
Rudolph Sonnenberg
BY
ATTORNEY.

Patented Aug. 25, 1936

2,052,520

UNITED STATES PATENT OFFICE 2,052,520

HOLDER FOR DENTAL FLOSS AND THE LIKE

Rudolph Sonnenberg, South Bend, Ind.

Application August 25, 1934, Serial No. 741,394

1 Claim. (Cl. 132—92)

This invention relates to a holder for dental floss and other material suitable for removing foreign matter from between teeth which will maintain the floss under tension while it is being used, and has for its principal object to provide a body formed with spaced arms across which the material is stretched and secured so that it can be readily used.

Another object is to provide a holder which can be attached to a container adapted to receive dental floss and which has spaced arms across which the floss is maintained under tension in position for convenient use.

Another object is to provide a holder forming a part of a cap for a container adapted to receive dental floss which has spaced arms formed with depressions or recesses therein across which the floss is stretched and secured in position for convenient use.

Another object is to provide a holder forming a part of a cap for a container adapted to receive dental floss which has spaced openings therein through which the floss is threaded and which has spaced arms across which the floss is stretched and secured in position for convenient use.

Another object is to provide a holder for dental floss and the like adapted for removing foreign matter from between the teeth which comprises a U-shaped body having transversely extending openings therein through which the floss is threaded and then stretched over the arms of the body and secured in position for use.

Another object is to provide a holder having a handle and a U-shaped head extending therefrom formed to receive and hold dental floss or other material for removing foreign matter from between teeth.

Another object is to provide a device having a handle and a head extending therefrom formed with spaced members between which dental floss or other material is maintained under tension in position for removing foreign matter from between teeth.

Other objects, and objects relating to details of construction and methods of manufacture, will be apparent from the drawing and the detailed description to follow.

In the drawing, in which like numerals refer to like parts throughout the several views, and which shows two suitable embodiments of my invention:

Fig. 1 is a side elevational view of a container adapted to receive dental floss having a holder embodying my invention attached thereto.

Fig. 2 is a side elevational view of the holder looking in the opposite direction of Fig. 1.

Fig. 3 is an enlarged detailed sectional view, taken on the line 3—3 of Fig. 1, showing the means for securing the floss under tension together with a means for cutting off the used end of the floss.

Fig. 4 is an end elevational view looking in the direction of the arrows 4—4 of Fig. 1, showing one of the arms over which the floss is stretched.

Heretofore when it was desired to use dental floss for cleaning foreign matter from between teeth, it was necessary to wrap the floss around the fingers and then work the floss between the teeth which necessitated putting one of the fingers in the mouth, which was an uncomfortable and insanitary operation. Also, dentists when using abrasive ribbon for cleaning foreign matter from between the teeth or filing the fillings, likewise had to insert one or more of the fingers in the patient's mouth, the operation being awkward and there always being danger of carrying germs into the patient's mouth. In my present invention, the objections and disadvantages heretofore present in cleaning foreign matter from between the teeth has been eliminated as a clean piece of dental floss or a clean abrasive ribbon can be used without the user's fingers coming in contact with the mouth.

Referring particularly to Figs. 1 to 4 inclusive of the drawing, I have illustrated a container 10 adapted to receive a spool or roll of dental floss A, which container is preferably formed with a screw-threaded neck 11 over which the cap 12 is screw-threaded thereon, which may be like devices now in common use. Formed integrally with, or rigidly secured to, the cap 12 is a floss holder indicated generally by the numeral 13 which is formed with a portion 14 extending substantially parallel with the longitudinal axis of the container 10 and having a U-shaped head formed with a body portion 15 and arms 16 and 17 extending therefrom. A hole or opening 18 is formed in the head of the cap 12 and the holder portion 14 through which the floss A is threaded. The holder is also provided with a series of spaced transversely extending openings 19 therein through which the floss A is also threaded, one of the openings 19 being adjacent to the rounded end 20 of the arm 16. Each of the arms 16 and 17 are provided with grooves or slots 21 in the face thereof to maintain the floss in position on the arms. A securing means sutable for attaching the floss to the head comprises a dish-shaped washer 22 riveted or otherwise secured at 23 to the extending portion 14 of the holder. The free end of the floss is wrapped and wedged between the washer 22 and the holder, as is shown in Fig. 3, to thus prevent the loosening of the floss relative to the head. The free end of the floss can be cut off by a knife 24 formed by punching out the metal of the cap 12, as is clearly shown in Fig. 1.

When it is desired to thread the floss on the holder, the cap 12 is unscrewed from the container 10, after which the end of the floss is threaded through the opening 18 and the cap again screwed on to the container which can then be used as a suitable handle. The floss is then preferably threaded through the openings 19, as is clearly shown in Figs. 1 and 2, after which it is wrapped around the arm 16 at 25, preferably two or three wraps being used, then the end of the floss is carried across the slots or depressions 21 in the arms 16 and 17 and then wound between the washer 22 and the head to secure the floss under tension so that the portion extending between the arms 16 and 17 will not work loose or give way when the user desires to work the floss between the teeth to clean foreign matter therefrom.

It will be apparent that when the floss as illustrated in Fig. 1 has been used that the end can be unwound from between the washer 22 and the head, and then unwound at 25, whereupon a portion of the floss will be pulled from the container and then wound around the arm 16 at 25, stretched between the arms 16 and 17 and then secured by the fastening member 22 so that a new sanitary piece of floss is again available for use.

While I have shown and described two suitable embodiments of my invention, it will be well understood by those skilled in the art that other changes which will be apparent to those skilled in the art can be resorted to without departing from the spirit and substance of my invention, the scope of which is to be measured entirely by the subjoined claim.

What I claim is:

A device for holding dental floss under tension comprising, a container adapted to receive a roll of floss, a cap attached to the open end thereof, a floss holder extending from said cap having an outer body part extending at an angle to the longitudinal axis of said container, a pair of spaced arms extending substantially perpendicular to said outer body part, a knob at the end of the outer arm, an opening in the body portion adjacent to said cap to permit threading the floss therethrough, openings substantially at the junctures of said outer body part and arms to permit threading the floss therethrough, slots in the end of said knob and at the end of said inner arm for receiving the floss, and means fixed on the body portion adjacent to said cap to secure the free end of the floss.

RUDOLPH SONNENBERG.